United States Patent
Liu et al.

(10) Patent No.: US 7,840,213 B2
(45) Date of Patent: Nov. 23, 2010

(54) SYSTEM, APPARATUS AND METHOD COPING WITH MOBILE SWITCHING NODE FAILURE

(75) Inventors: Wenyu Liu, Shenzhen (CN); Fang You, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 771 days.

(21) Appl. No.: 11/756,123

(22) Filed: May 31, 2007

(65) Prior Publication Data

US 2007/0281686 A1 Dec. 6, 2007

(30) Foreign Application Priority Data

May 31, 2006 (CN) .................. 2006 1 0060974

(51) Int. Cl.
*H04W 4/00* (2009.01)
(52) U.S. Cl. .................... 455/433; 455/432.1
(58) Field of Classification Search ........... 455/432.1, 455/433
See application file for complete search history.

(56) References Cited

U.S. PATENT DOCUMENTS

| | | | |
|---|---|---|---|
| 6,219,546 B1 * | 4/2001 | Valentine et al. ............ 455/428 |
| 6,408,182 B1 * | 6/2002 | Davidson et al. ............ 455/433 |
| 6,597,910 B1 * | 7/2003 | Ra .............................. 455/433 |
| 2002/0009991 A1 * | 1/2002 | Lu et al. ..................... 455/422 |
| 2005/0192005 A1 * | 9/2005 | Blom et al. ................ 455/432.1 |
| 2006/0205404 A1 * | 9/2006 | Gonen et al. .............. 455/432.1 |
| 2008/0092225 A1 * | 4/2008 | Nieuwenhuis ............... 726/12 |

FOREIGN PATENT DOCUMENTS

| | | |
|---|---|---|
| CN | 1206542 A | 1/1999 |
| CN | 1290459 A | 4/2001 |
| CN | 1434574 A | 8/2003 |
| CN | 1545345 A | 11/2004 |
| CN | 1592281 A | 3/2005 |
| CN | 1738267 A | 2/2006 |
| DE | 102004020651 A | 11/2005 |
| WO | WO 2005/041491 A1 | 5/2005 |

OTHER PUBLICATIONS

International Search Report from International Application No. PCT/CN2007/000372.
Foreign Communication from a Counterpart Application—PCT/CN2007/000275, International Search Report and Written Opinion, May 24, 2007, 5 pages.

* cited by examiner

*Primary Examiner*—Jinsong Hu
*Assistant Examiner*—Mong-Thuy Tran
(74) *Attorney, Agent, or Firm*—Conley Rose, P.C.; Grant Rodolph (57) ABSTRACT

A system, an apparatus and a method for coping with mobile switching node failure are disclosed. The method includes: an HLR (Home Location Register) detects that a first MSC (Mobile Switching Center) is not able to operate; the requesting party of a terminating service submits a request to the HLR for obtaining required location information for a called party registered on the first MSC, and the HLR selects a second MSC for the requesting party and requests for location information from the second MSC; the second MSC returns the location information to the HLR; the HLR returns the location information to the requesting party of the terminating service; and the requesting party of a terminating service performs subsequent service according to the location information.

12 Claims, 6 Drawing Sheets

Fig.12

SYSTEM, APPARATUS AND METHOD COPING WITH MOBILE SWITCHING NODE FAILURE

This application claims the priority of CN Application No. 200610060974.4 filed on May 31, 2006, titled "SYSTEM, APPARATUS AND METHOD COPING WITH MOBILE SWITCHING NODE FAILURE", which is incorporated herein by reference in its entirety.

FIELD OF THE INVENTION

The present invention relates to the technical field of telecommunications, in particular, to a telecommunication system, an apparatus and a method coping with mobile switching node failure.

BACKGROUND OF THE INVENTION

With the development of telecommunication and the growth of network capacity, reliability becomes more and more important. It has been a consideration for each apparatus manufacturer how to prevent single point failure from causing service interruption in large area.

Iu-Flex technology is a disaster recovery mechanism in circuit switched domain introduced by 3GPP in Release 5, wherein the concept of "pool" is defined, and a pool includes a plurality of RNCs (Radio Network Controllers)/BSCs (Base Station Controllers) and a plurality of CN (Core Network) Elements. Each RNC/BSC node may be connected to a plurality of CN Network Elements.

Normally, Iu-Flex mechanism may be ensured by NRI (Network Resource Indicator) mode, when a certain subscriber roams in an area administrated by a pool, all of the CN processing are performed on a specific CN node in the pool; that is, for a single subscriber, the subscriber has only one CN Processing Node, thus frequent location update can be avoided. However, for all the subscribers in the pool, they are distributed to different CN Nodes in the pool, thus load sharing is achieved; this distribution of subscribers among CN nodes in the pool should be determined by the RNC when the subscribers initially register according to some IMSI-HASH algorithm, and all the subsequent NAS (Non Access Stratum) processes going to the same CN noted are ensured by NRI. In abnormal circumstances, if failure occurs on a certain CN node in the pool, the RNC uses some mechanism to change the CN node which is supposed to handle messages from a subscriber, e.g. in normal case, the register message initiated from subscriber A is determined to go to MSC1 (Mobile Switching Center 1) by RNC, then MSC1 breaks down and RNC chooses MSC2 for subscriber A. Afterwards when subscriber A sends out a register message, RNC will send it to MSC2. The term "re-distribute load" is used to describe the change of CN node hereinafter.

Figure 1:
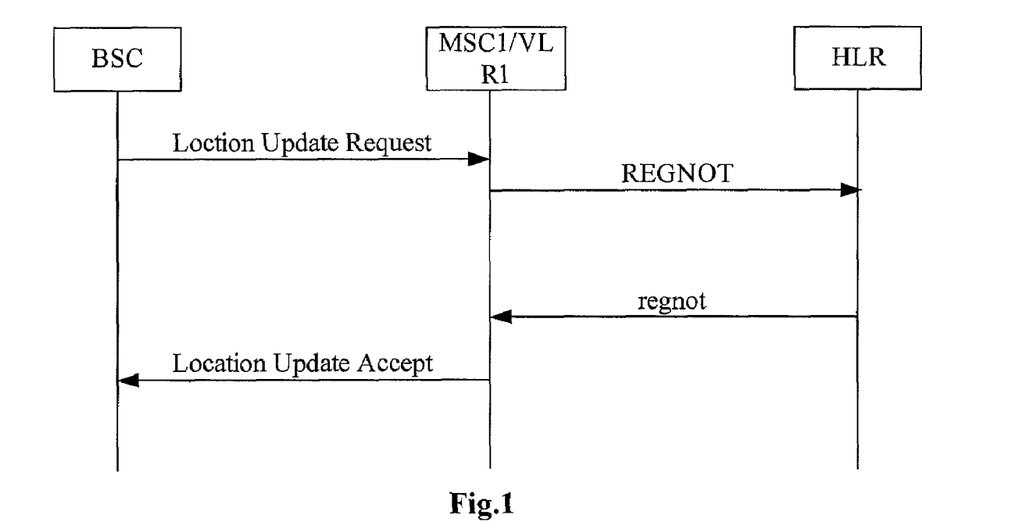
FIG. 1 is a flow chart of location registration in the prior art.

Similarly, a mechanism named A-Flex, may also be disposed in a CDMA2000 network; that is, a BSC in a CDMA2000 network may be connected to a plurality of MSCs/VLRs (Mobile Switching Centers/Visit Location Registers). Similar to the concept of "pool" in 3GPP, the A-Flex area in the present invention is a set of elements which includes at least one BSC (usually a plurality of BSCs) and at least two MSCs/VLRs serving the BSCs simultaneously. Each BSC is connected with all the MSCs/VLRs in the area. FIG. 1 shows a flow chart of location registration in the prior art, which is illustrated as following. A BSC sends a location registration message, Location Update Request, to MSC1/VLR1 for location registration; the MSC1/VLR1 then detects that change occurs in the MSC/VLR in which the subscriber exists, and sends a registration notification request (REG-NOT) carrying location information of the subscriber to the HLR (Home Location Register); the HLR returns a registration notification response (regnot) to MSC1/VLR1; and MSC1/VLR1 returns a message Location Update Accept, which indicates that the location information has been updated, to the BSC.

However, in the prior art, no matter whether it is Iu-Flex or A-Flex, it cannot avoid communication interruption when the subscriber's serving MSC/VLR suddenly breaks down and is not able to process signaling. It is imagined that various reasons may cause an MSC/VLR breaking down suddenly, such as too heavy traffic, burst failure and so on. In Iu-Flex mechanism, after it is determined to re-distribute load, because the RNC only re-determines the MSC/VLR to which a message related to a subscriber should be sent when the location is updated, the load re-distribution could not be really achieved until the next location update, which means the originating call and terminating call can not be processed by the new MSC/VLR until the location of the subscriber is updated (messages are sent to the original MSC/VLR according to NRI, original old MSC/VLR has broken down and could not process signaling). As a result, if the original MSC/VLR breaks down suddenly, signaling may not be processed normally, and at this point, subscribers registered on the MSC/VLR will be in a communication failure state before next location updating; the communication failure time period may depend on when the next periodicity location update comes or when other operations (e.g. network forced location registration, automatic location registration triggered by the subscriber moving to a new location area) that may trigger location registration occur.

SUMMARY OF THE INVENTION

The embodiments of the invention provide a system, an apparatus and a method coping with MSC/VLR failure, by means of which it may be prevented that a subscriber cannot perform terminating service before re-registration in case the serving MSC/VLR breaks down suddenly and cannot process signaling. That means, subscriber can be re-distributed to another MSC/VLR right away after MSC/VLR breaks down, thus the terminating service of the subscriber could be performed on the new MSC/VLR The technical solution according to the embodiments of the invention is as follows:

A method coping with mobile switching node failure, which is used in a system comprising at least one BSC (Base Station Controller), at least two MSCs (Mobile Switching Centers) and at least one HLR (Home Location Register), including:

detecting that failure occurs on a first MSC by the HLR;

submitting a request to the HLR for obtaining location information of a called party by a requesting party of a terminating service, wherein the called party is registered on a first MSC, and selecting a second MSC for the requesting party and requesting for the location information from the second MSC by the HLR;

returning the location information to the HLR by the second MSC; and returning the location information to the requesting party of the terminating service by the HLR, and performing subsequent service according to the location information by the requesting party of the terminating service.

A system coping with mobile switching node failure, comprising at least two MSCs connected with an HLR, wherein:

the HLR is used for detecting that failure occurs on a first MSC of the at least two MSCs, receiving a request from a requesting party of a terminating service for obtaining location information for a called party, selecting a second MSC for the requesting party and requesting for the location information from the second MSC, and receiving the location information returned by the second MSC and sending the location information to the requesting party of the terminating service.

An apparatus coping with mobile switching node failure, comprising a service-processing module, the apparatus further comprises a detecting module and a selecting module, wherein:

the detecting module is used for detecting states of connected MSCs, when it is determined that the MSC is unreachable;

the service-processing module is used for notifying the selecting module to reselect after it is found that failure occurs on the MSC from which location information of a called party needs to be obtained, and interacting with another non-failed MSC according to selection information returned by the selecting module; and the selecting module is used for selecting the another non-failed MSC from all the MSCs connected according to a notification received, and notifying the service-processing module of the selected non-failed MSC.

The embodiments of the invention provide a system, an apparatus and a method coping with MSC failure. When failure occurs on the original MSC/VLR and a subscriber, who registered on the original MSC/VLR currently receives a terminating service, the HLR selects another non-failed MSC/VLR for processing the terminating service, so that the subscriber will still be able to receive terminating service correctly even though failure occurs on the original MSC/VLR. Thus, a circuit domain disaster recovery scheme in the network will be sounder, and the system stability will be improved.

DETAILED DESCRIPTION

Preferred embodiments of the invention will be illustrated in detail in conjunction with the drawings.

In an embodiment of the invention, if an HLR detects that a first MSC cannot work, when the requesting party of a terminating service submits a request to the HLR for obtaining location information for a called party registered on the first MSC, the HLR selects a second MSC in the same A-Flex area, and after the location information is obtained, it will be returned to the requesting party for performing terminating service. When the second MSC needs to search the called party, if paging area information can be obtained, it searches for the called party in this area; otherwise, it searches through all the BSCs administrated by the second MSC.

Figure 2:
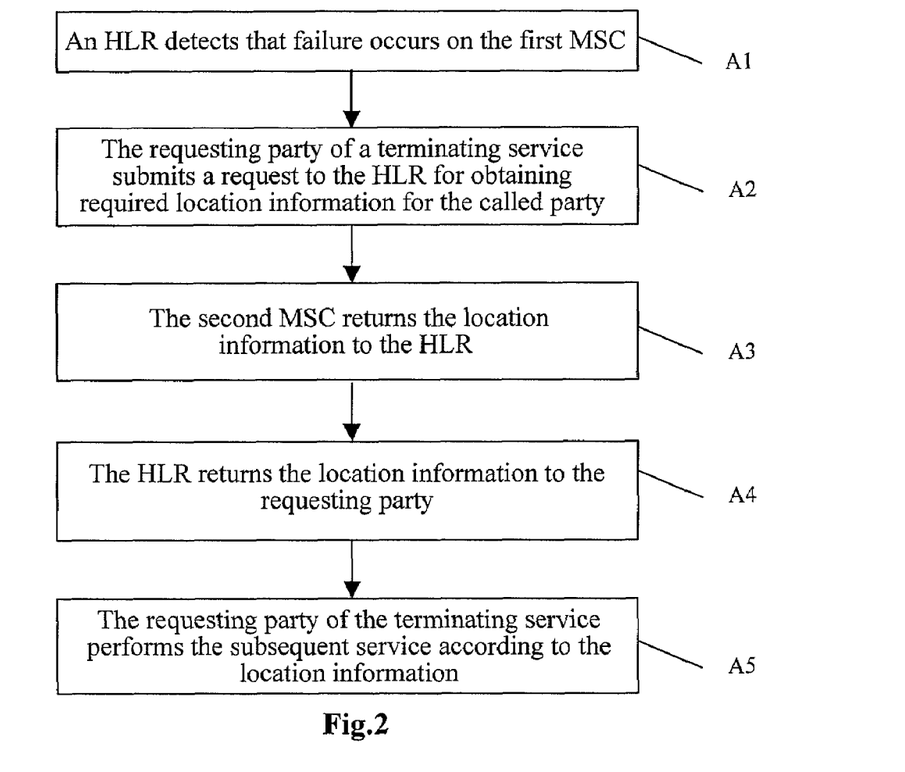
FIG. 2 is a schematic flow chart according to one or more embodiments of the invention.

Therefore, the embodiments of the invention provide a method for coping with MSC failure, which is adapted to a system including at least one BSC, at least two MSCs and at least one HLR (Home Location Register), wherein the BSC is connected with the MSCs. The flow chart of the method is shown in FIG. 2, which includes the following steps:

Step A1. HLR detects that failure occurs on the first MSC, MSC1/VLR1. When MSC1/VLR1 breaks down suddenly and signaling cannot be processed, the HLR detects that the destination signaling point is unreachable, or according to information reported by other means, for example, failure information reported to the HLR by an operation maintenance entity via a management interface or by an AC (Authentication Center), HLR thereby determines that failure occurs on the original MSC1/VLR1 and the original MSC1/VLR1 cannot work.

Step A2. The requesting party of a terminating service submits a request to the HLR for obtaining required location information of the called party registered on MSC1/VLR1, and the HLR selects MSC2/VLR2 as the second MSC and requests for the location information of the called party from the selected second MSC. The above location information may be a TLDN (Temporary Local Directory Number) of the called party or the ID of the MSC serving the called party, which is used for routing the signaling to the MSC which will perform terminating service for the called party.

Step A3. The second MSC returns the location information to the HLR. The returned location information is carried in an MAP (Mobile Application Part) message. It should be noted that the MAP message may be an extension of the existing MAP messages.

Step A4. The HLR returns the location information to the requesting party.

Step A5. The requesting party performs the subsequent service according to the location information. If it is a terminating call process, the obtained location information is TLDN (Temporary Local Directory Number); if it is an SMS (Short Message Service) Delivery process, the obtained location information is SMS Address. The requesting party of a terminating service sends message using the information. If it is a terminating call process, an IAM (Initial Address Message) is sent; if it is an SMS Delivery process, an SMSDPP message is sent.

It should be pointed out that in the embodiments of the invention, the MSC may be with VLR functionality. Therefore, according to the embodiments of the invention, the reason why the MSC fails may be failures on the VLR of the MSC, and the method according to the embodiments of the invention is also applicable for such a situation. Although illustrations may be made only on MSC in the embodiments of the invention, the situation in which failure occurs on VLR should be apparent to those skilled in the art.

In the method according to one embodiment of the invention, in Block A2, the HLR selects the second MSC according to local configuration information or mutual-aid MSC information obtained from the first MSC. When a terminating service occurs and needs to obtain the location information of the called party from MSC1/VLR1, the HLR selects a second MSC/VLR (such as MSC2/VLR2), which pertains to the same A-Flex area as MSC1/VLR1, according to a strategy such as local configuration information or the mutual-aid MSC information obtained from MSC1/VLR1 previously. If the paging area information of the called party is stored in the HLR, it may be carried in an MAP ROUTREQ (MAP Routing Request) message or an MAP SMSREQ (MAP Short Message Service Request) message, so as to help MSC2/VLR2 to reduce the subscriber-searching area; otherwise, when MSC2 needs to search for the called party, it pages through all the BSCs connected with MSC2/VLR2. The above mutual-aid MSC refers to an MSC that may be substituted for the current MSC to process services when failure occurs on the current MSC. Mutual-aid MSCs should belong to the same A-Flex area.

In the case of a terminating call service or delivering a short message via a service channel, the searching process is paging. Paging in all the BSCs connected with the MSC/VLR is also referred to as whole network paging. In the case of delivering a short message via Control Channel, the searching process is sending a Registration Request message from the MSC/VLR to part or all of the BSCs connected. The process in which the second MSC pages a subscriber may take place after receiving ROUTREQ (in the case of early paging), or it may take place after an incoming message from the requesting party of a terminating service is received (in the case of normal paging). Part of the following embodiments will be emphasized to describe the case of normal paging, and the other part will be emphasized to describe the case of early paging. It should be noted that the embodiments of the invention are applicable for both of these two cases, and the implementation of early paging and normal paging should be apparent to those skilled in the art.

To distinguish the abnormal case in which the MSC receives a request message by error for obtaining location information for a subscriber unregistered on the current MSC, in one embodiment of the invention, in Block A2, when the HLR requests for the location information from the second MSC, it may optionally carry a flag which indicates that the MSC needs to process the subsequent terminating service. Thus, MSC2/VLR2 is required to return the location information of a subscriber unregistered on the current MSC only when this flag is received; otherwise, it is processed according to the existing process directly.

In the embodiments of the invention, the HLR employed may or may not have a function of storing paging area information of a called party. The paging area location information may be BSCID (BSC ID) or LAC (Location Area Code), used for determining the location or area for searching for a subscriber. The method will now be illustrated in the two cases respectively.

If the HLR has the function of storing paging area information, the paging area information may be carried in a ROUTREQ message (Terminating Call) or in an SMSREQ message (Short Message service delivery) to the second MSC, for reducing the subscriber-searching area. The paging area information may also be carried in a message locreq (Terminating Call) or an message smsreq (SMS delivery) to the requesting party of the terminating service, then the requesting party of the terminating service carries it to the second MSC in an incoming message, IAM message (Terminating Call) or an SMSDPP message (SMS delivery). The method according to the embodiments of the invention further includes the processes of notifying the HLR of the paging area information of the subscriber by the MSC and saving the paging area information by the HLR, which includes the following processes: B1. the MSC detects the change in the information of the paging area in which the subscriber locates, and sends a location update message carrying the subscriber location information to the HLR; B2. the HLR updates and saves the paging area information of the corresponding subscriber. In Block B1, the MSC reports the subscriber location information to the HLR in an MAP REGNOT message.

Figure 3:
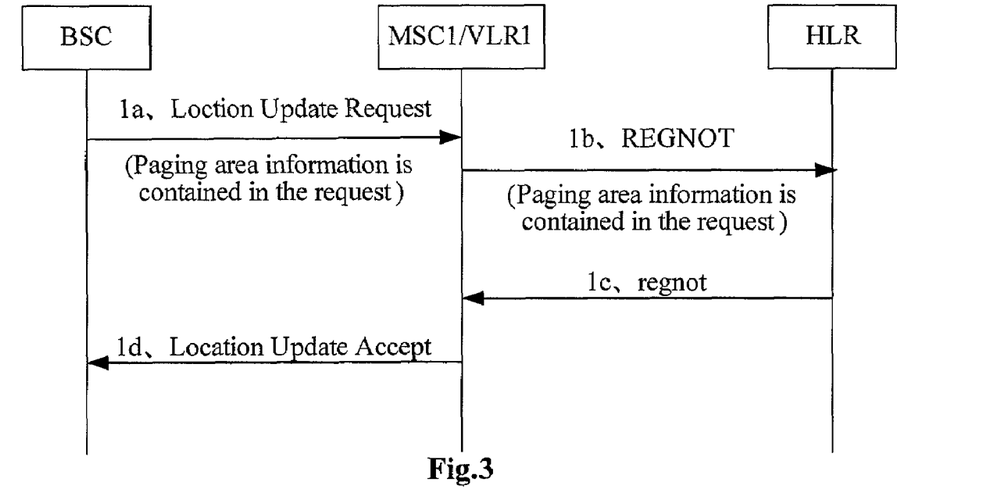
FIG. 3 is a schematic diagram showing the process in which the HLR obtains subscriber-paging area information according to one or more embodiments of the invention

The specific processes are shown in FIG. 3, as illustrated in the following.

1a. A BSC sends a location registration request message, i.e. Location Update Request, in which the information of the paging area where the subscriber locates is carried, to MSC1/VLR1 for location registration.

1b. If MSC1/VLR1 detects the change in the information of the paging area in which the subscriber locates, it sends a request REGNOT to the HLR, in which the information of the paging area where the subscriber locates is carried; it should be pointed out that the request message carrying the paging area information of the subscriber may be an extension of the existing message, which can carry the paging area information.

1c. The HLR updates and saves the paging area information of the subscriber, and returns a response regnot to MSC1/VLR1.

1d. MSC1/VLR1 returns a Location Update Accept message, which indicates that the location information has been updated, to the BSC.

Figure 4:
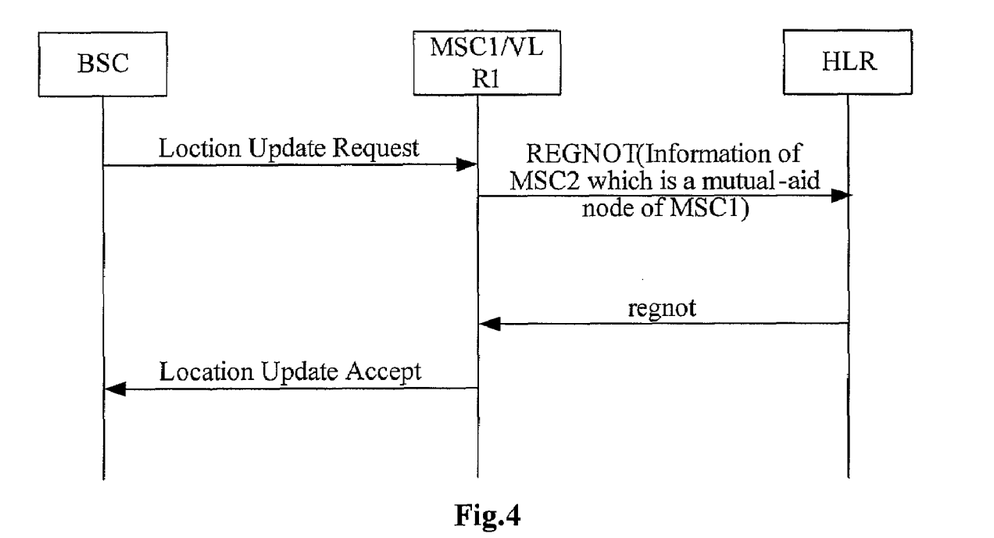
FIG. 4 is a schematic diagram showing the process in which the HLR obtains MSC/VLR mutual-aid node information according to one or more embodiment of the invention.

The method in which the HLR selects another available MSC/VLR is shown in FIG. 4, which is illustrated in the following texts.

The HLR locally configures the A-Flex areas to which each MSC pertains; for example, on the HLR, MSC1, MSC2 and MSC3 are configured to pertain to A-Flex area 1, while MSC4, MSC5 and MSC6 pertain to A-Flex area 2. Thus, when it is detected that failure occurs on MSC1 and a terminating service needs to be performed for a subscriber registered on MSC1, an available MSC in A-Flex area 1, such as MSC2 may be selected (that is, MSC2 is a mutual-aid MSC node of MSC1); if failure occurs on MSC5 and a terminating service needs to be performed for a subscriber registered on MSC5, an available MSC in A-Flex area 2, such as MSC4 may be selected (that is, MSC4 is a mutual-aid MSC node of MSC5).

Optionally, when a subscriber performs location registration, a serving MSC (the MSC which provides services to a subscriber currently is referred to as serving MSC) optionally carries a mutual-aid MSC to be used after failures occur on the current MSC in the location registration message, according to local configuration. For example, on MSC1, MSC2 is configured as a mutual-aid MSC of MSC1 in the same A-Flex area; the HLR saves the mutual-aid MSC information and selects the saved mutual-aid MSC for performing terminating service after a failure occurs on the serving MSC. It should be noted that the mutual-aid MSC information sent by the MSC to the HLR may not be contained in each location update message, and the possible implementing process is that after the MSC has sent the mutual-aid node information to the HLR, the mutual-aid node information will not be contained in the location update message until the mutual-aid node information changes.

The mutual-aid node information in the message REG-NOT may be conveyed by extending the existing parameters, or by adding new parameters.

In addition, the serving MSC may also carry the mutual-aid node information in other MAP messages, such as MAP messages newly defined for reporting the mutual-aid node information, and the mutual-aid node information may be reported periodically or immediately after the local configuration changes, or in a combination mode thereof. Optionally, the serving MSC may return the mutual-aid node information in a response message after the HLR initiates a new MAP request message, such as a mutual-aid node request message, to the serving MSC first. The HLR may also initiate the request periodically. In the embodiments, the method for an HLR to obtain a mutual-aid node from the first MSC is not limited.

Figure 5:
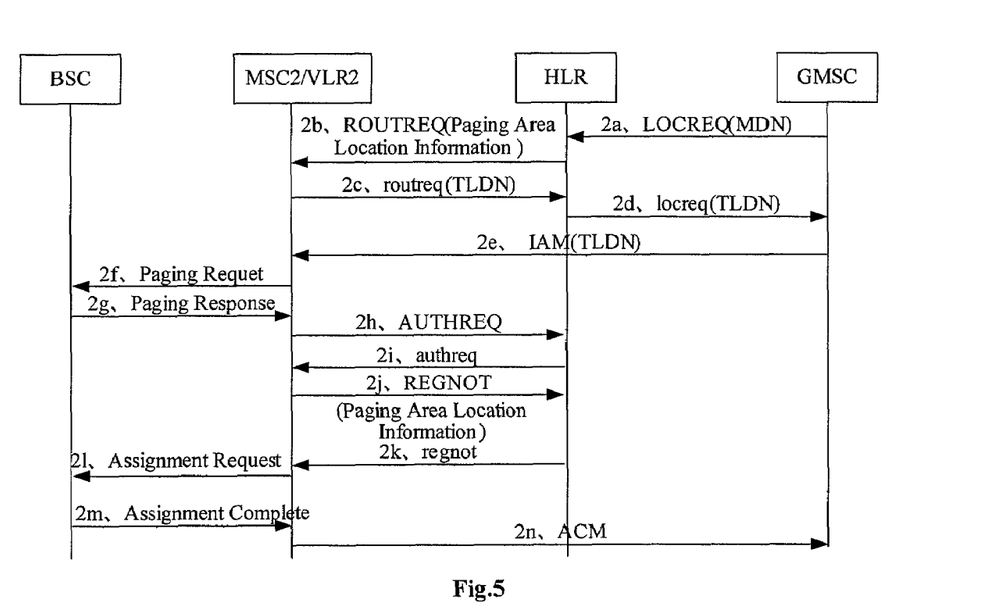
FIG. 5 is a schematic flow chart showing the process in which a terminating call performs normal paging using the paging area information according to one or more embodiments of the invention.

After MSC2/VLR2 receives a TLDN from an incoming IAM, it pages the subscriber according to the paging area location information obtained from the request ROUTREQ. When a paging response is returned, the terminating process proceeds normally, as shown in FIG. 5, which will be illustrated in the following texts. The paging area information is saved in the HLR, and the paging area information is carried to a second MSC via an MAP message. The MAP message is a ROUTREQ message or other newly defined MAP messages. It should be noted that the MAP message should have the ability to carry paging area information.

2a. A GMSC (Gateway Mobile Switching Center) sends a message, i.e. LOCREQ, which carries the called MDN (Mobile Directory Number), to the HLR, for querying the location information of a called party;

2b. If the HLR detects that failure has occurred on MSC1/VLR1 on which the current called party registers, it selects another MSC2/VLR2 for the subscriber according to a strategy and sends a request, i.e. ROUTREQ, which carries the paging area location information of the subscriber saved in the HLR, to MSC2/VLR2;

2c. MSC2/VLR2 receives the request, i.e. ROUTREQ, and assigns a TLDN (Temporary Local Directory Number) to the subscriber, and returns it to the HLR in a message, i.e. routreq;

2d. The HLR sends an MAP location request response message, i.e. locreq, in which the TLDN is carried, to the GMSC;

2e. The GMSC sends a message, i.e. IAM (Initial Address Message), which carries the called TLDN, to MSC2/VLR2 which assigns the TLDN to the called party;

2f. After MSC2/VLR2 receives the TLDN, it will find suitable BSC/BSCs to initiate a Paging Request according to the paging area location information obtained from the request ROUTREQ;

2g. The BSC sends a paging response, i.e. Paging Response, to MSC2/VLR2;

2h. If MSC2/VLR2 detects that there is no subscriber data, it initiates an authentication request, i.e. AUTHREQ, to the HLR;

2i. If the authentication is passed, the HLR returns a response, i.e. authreq, which indicates that the authentication is passed, to MSC2/VLR2;

2j. MSC2/VLR2 sends a location registration message, i.e. REGNOT, to the HLR;

2k. The HLR returns a message, i.e. regnot, which carries back the subscriber data;

2l. MSC2/VLR2 initiates an assignment request message, i.e. Assignment Request, which requests the BSC to assign an air interface channel for the subscriber;

2m. The BSC returns a message, i.e. Assignment Complete;

2n. At this point, the called party starts to be alerted, and MSC2/VLR2 returns an ACM (Address Complete Message) to the GMSC.

The above process is a normal process when a subscriber is called according to one embodiment of the invention. It must be noted that if the authentication is not passed in step 2h, the terminating service will be failed; and the processes related to BSC, MSC/VLR, HLR and the Originating Call, Terminating Call and so on between the BSC, MSC/VLR, HLR and the subscribers are well known to those skilled in the art, so it will not be described again here.

The process of the present method may also be as follows: the requesting party of a terminating service obtains the paging area information from the HLR, and carries the paging area information to a second MSC in an incoming IAM; wherein, the HLR carries the paging area information saved therein to the requesting party of the terminating service in an MAP message. In such a case, the processes corresponding to processes 2b~2f are as follows:

2b1. If the HLR detects that failure has occurred on MSC1/VLR1 on which the current called party registers, it selects another MSC2/VLR2 for the subscriber according to a strategy and sends a request, i.e. ROUTREQ, to MSC2/VLR2, wherein the paging area location information of the subscriber is not carried in the message;

2c1. MSC2/VLR2 receives a request, i.e. ROUTREQ, assigns a TLDN to the subscriber, and returns it to the HLR in a message, i.e. routreq;

2d1. The HLR sends an MAP location request response message i.e. locreq, which carries the TLDN and the paging area location information of the subscriber saved in the HLR, to GMSC;

2e1. The GMSC sends a message, i.e. IAM, which carries the called TLDN and the paging area location information of the subscriber, to MSC2/VLR2 which assigns a TLDN to the called party;

2f1. After MSC2/VLR2 receives the called TLDN and the paging area location information of the subscriber, it will find suitable BSC/BSCs to initiate a Paging Request according to the paging area location information.

In the method according to one embodiment of the invention, the paging area location information of a subscriber is recorded in an HLR, and when failure occurs on the original MSC, a second MSC can be determined to substitute the original MSC according to a strategy, so that terminating service can be performed for a subscriber who initially registers on the original MSC. In the method according to the embodiment of the invention, the process to save and update the paging area information of a subscriber in the HLR can help a second MSC to reduce the subscriber-searching area to one location area or one BSC. It is well known to those skilled in the art that in the prior art, an HLR can determine the MSC in which a subscriber locates.

Figure 6:
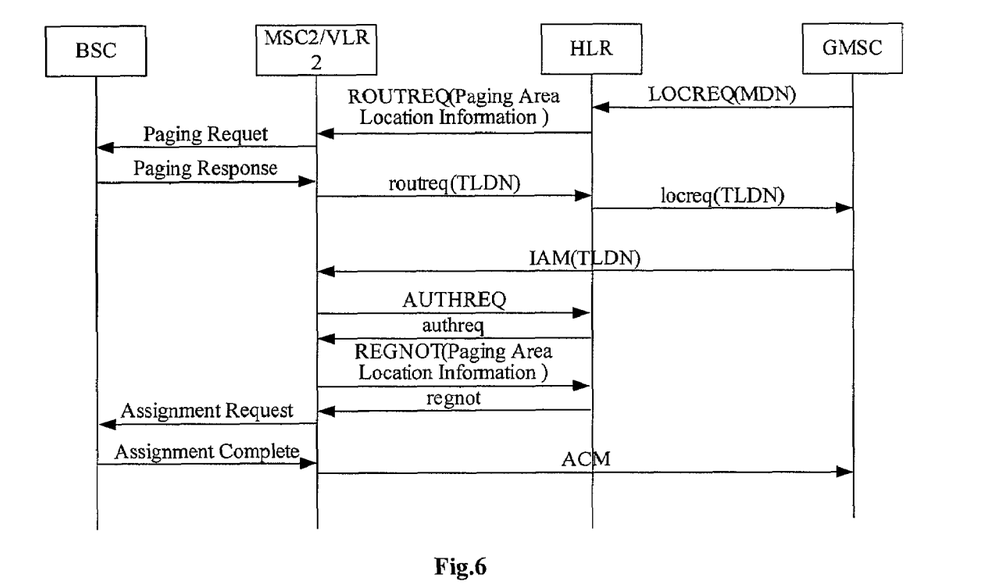
FIG. 6 is a schematic flow chart showing the process in which a terminating call performs early paging using the paging area information according to one or more embodiments of the invention.

With reference to FIG. 2, in Block A3, before location information is returned to the HLR, the second MSC pages the called party through the BSC according to the paging area information of the called party. The case of early paging according to one embodiment of the invention is as shown in FIG. 6, wherein, MSC2/VLR2 first pages the subscriber after receiving the request, i.e. ROUTREQ, that is, it sends a paging request to the BSC, then returns a message, i.e. routreq, to the HLR only after receiving a paging response message, and carries back a TLDN; other processes are the same as those in the embodiment shown in FIG. 5, and it will not be described again here.

Figure 7:
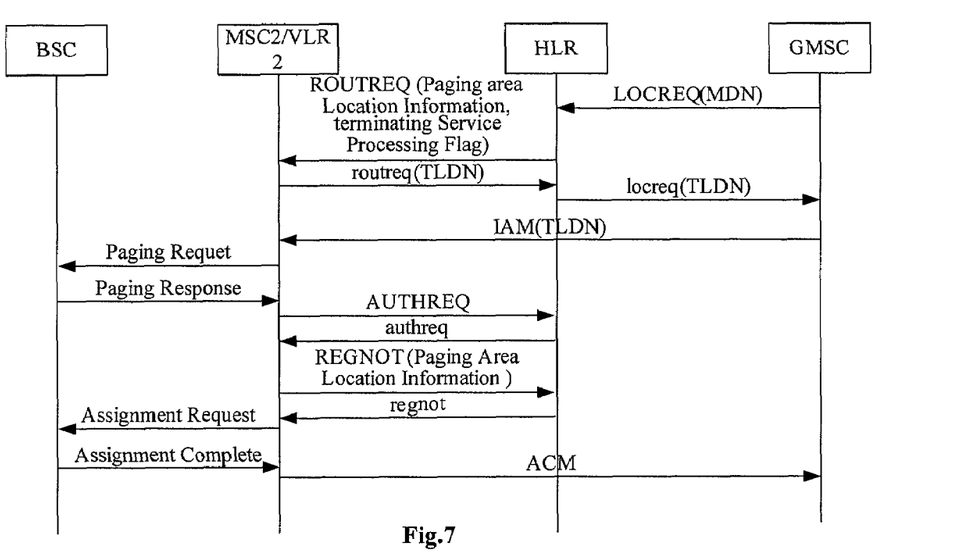
FIG. 7 is a schematic flow chart of a terminating call using a terminating service processing flag and paging area information according to one or more embodiments of the invention.

In one or more embodiments of the invention, the functionality of storing the paging area location information of a subscriber is enhanced in the HLR, and when other available MSC/VLR is selected for the subscriber after the original MSC/VLR fails, the paging area location information can be carried to the new MSC/VLR for searching for the subscriber; the schematic flow chart of a terminating call which carries a terminating service processing flag and uses paging area information according to one embodiment of the invention is shown in FIG. 7. In the case that the current MSC/VLR has no subscriber data, by employing a mechanism in which a terminating service processing flag is carried in a message, i.e. ROUTE, sent by an HLR to the new MSC/VLR, the MSC/VLR according to one embodiment of the invention can return the subscriber location information, i.e. TLDN, after receiving the flag carried in the message from the HLR; otherwise, it will be processed according to the existing process. Other processes are the same as those in the embodiment shown in FIG. 5, and it will not be described again here. If the mechanism of carrying terminating service processing flag in the message, i.e. ROUTREQ, is not employed, the MSC/VLR according to the embodiment of the invention can unconditionally return the subscriber location information, i.e. TLDN, although the current MSC/VLR has no subscriber data.

When the HLR does not have the function of storing paging area information, embodiments of the invention further provide a method in which the HLR is not required to save the paging area location information of a subscriber, wherein the paging area information is BSC ID or location area information. First of all, the process of location registration is performed, the steps of which are similar to those of the process shown in FIG. 1. The process of location registration may be carried out according to the prior art, and the paging area location information of a subscriber need not be reported to the HLR; specifically, the steps are as follows:

3a. A BSC sends a location registration request message, i.e. Location Update Request, to an MSC/VLR for performing location registration;

3b. If the MSC/VLR detects that change occurs on the MSC/VLR in which the subscriber locates, it sends a request, i.e. REGNOT, which carries the information of the MSC/VLR in which the subscriber locates, to the HLR;

3c. The HLR updates and saves the MSC/VLR information of the subscriber, and returns a response, i.e. regnot, to MSC/VLR1;

3d. MSC1/VLR1 returns a message, i.e. Location Update Accept, which indicates that the location information has been updated, to the BSC.

Figure 8:
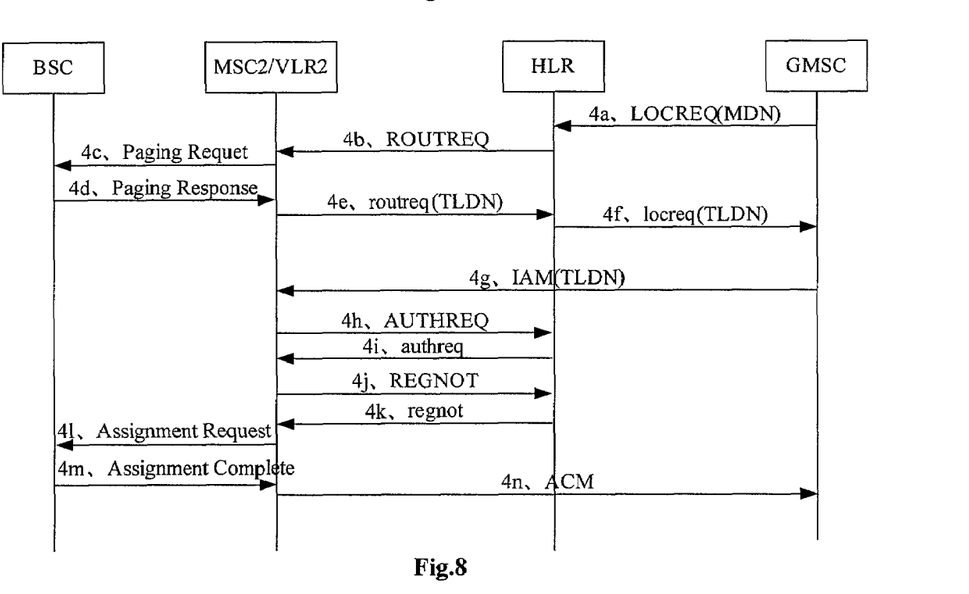
FIG. 8 is a schematic flow chart of a terminating call using whole network early paging according to one or more embodiments of the invention.

When the called party is to be paged, it is required to send a message, i.e. Paging Request, to all the BSCs connected with MSC2/VLR2; such a method may also be referred to as whole network paging. In the method according to one embodiment of the invention, in Block A3 in FIG. 2, before the location information is returned to the HLR, MSC2/VLR2 may search for the called party via whole network paging; that is, MSC2/VLR2 pages the called party in the coverage area of all the BSCs connected. As shown in FIG. 8, as illustrated in the following texts.

4a. A GMSC (Gateway Mobile Switching Center) sends a message, i.e. LOCREQ, which carries the called MDN (Mobile Directory Number), to the HLR, for querying the location information of a called party;

4b. If the HLR detects that failure has occurred on MSC1/VLR1 on which the current called party registered, it selects another MSC2/VLR2 for the called party according to the configuration, and sends a request, i.e. ROUTREQ, to MSC2/VLR2;

4c. After MSC2/VLR2 receives the request, i.e. ROUTREQ, it sends paging messages to all the BSCs connected, that is, it initiates a Paging Request to all the BSCs respectively;

4d. A Paging Response is sent to MSC2/VLR2 from a certain BSC;

4e. MSC2/VLR2 receives the paging response, assigns a TLDN to the subscriber, and returns it to the HLR in a message, i.e. routreq;

4f. The HLR sends an MAP location request response message, i.e. locreq, in which the TLDN is carried, to the GMSC;

4g. The GMSC sends a message, i.e. IAM, which carries the called TLDN, to MSC2/VLR2 which has assigned the TLDN to the called party;

4h. If MSC2/VLR2 detects that there is no subscriber data, it initiates an authentication request, i.e. AUTHREQ, to the HLR;

4i. If the authentication is passed, the HLR returns a response, i.e. authreq, which indicates that the authentication is passed, to MSC2/VLR2;

4j. MSC2/VLR2 sends a location registration message, i.e. REGNOT, to the HLR;

4k. The HLR returns a message, i.e. regnot, and carries back the subscriber data;

4l. MSC2/VLR2 initiates an assignment request message, i.e Assignment Request, which requests the BSC to assign an air interface channel for the subscriber;

4m. The BSC returns a message, i.e. Assignment Complete;

4n. At this point, the called party starts to be alerted, and MSC2/VLR2 returns an ACM (Address Complete Message) to the GMSC.

Similarly, the case of early paging is taken as an example in the above case, but it is not excluded that MSC2/VLR2 takes a normal paging mode, that is, a subscriber is paged after an incoming IAM message is received, and it will not be described again here.

It should be noted that in practical application, no matter whether the HLR has the function of storing paging area information or not, MSC2/VLR2 can page the called party in the coverage area of all the BSCs connected before the location information is returned to the HLR in Block A3 in FIG. 2. However, if the HLR has the function of storing paging area information, MSC2/VLR2 can obtain the paging area information of the called party from the HLR, and such whole network paging may not be performed. If the HLR does not have the function of storing paging area information, such whole network paging is required, because MSC2/VLR2 cannot determine a suitable BSC to initiate a paging process without that paging area information. However, the embodiments of the invention does not limit the specific implementing process of the whole network paging of the prior art. Moreover, the whole network paging or the paging in paging area may be performed in Block A5 in FIG. 2. Specifically, the method is similar to the method described previously. Here, the method will be illustrated briefly in the following texts by taking whole network paging as an example:

5a. A GMSC sends a message, i.e. LOCREQ, which carries the called MDN number, to HLR, for querying the location information of the called party;

5b. If the HLR detects that failure has occurred on MSC1/VLR1 on which the current called party registered, it selects another MSC2/VLR2 for the subscriber according to the configuration, and sends a request, i.e. ROUTREQ, to MSC2/VLR2;

5c. MSC2/VLR2 receives the request, i.e. ROUTREQ, assigns a TLDN to the subscriber, and returns it to the HLR in a message, i.e. routreq;

5d. The HLR sends an MAP location request response message, i.e. locreq, in which the TLDN is carried, to the GMSC;

5e. The GMSC sends a message IAM, which carries the called TLDN, to MSC2/VLR2 which has assigned the TLDN to the called party;

5f. After MSC2/VLR2 receives the called TLDN, it sends paging messages to all the BSCs connected, that is, it initiates Paging Request to all the BSCs respectively;

5g. A Paging Response is sent to MSC2/VLR2 from a certain BSC;

5h. If MSC2/VLR2 detects that there is no subscriber data, it initiates an authentication request, i.e. AUTHREQ, to the HLR;

5i. If the authentication is passed, the HLR returns a response, i.e. authreq, which indicates that the authentication is passed, to MSC2/VLR2;

5j. MSC2/VLR2 sends a location registration message, i.e. REGNOT, to the HLR;

5k. The HLR returns a message, i.e. regnot, and carries back the subscriber data;

5l. MSC2/VLR2 initiates an assignment request message, i.e. Assignment Request, which requests the BSC to assign an air interface channel to the subscriber;

5m. The BSC returns a message, i.e. Assignment Complete;

5n. At this point, the called party starts to be alerted, and MSC2/VLR2 returns an ACM to the GMSC.

Similarly, when the HLR sends a request, i.e. ROUTREQ, to the MSC/VLR selected, it may also carry a flag which indicates that a subsequent service needs to be performed. This flag enables the selected MSC2/VLR2 to determine whether or not a terminating service needs to be performed for the subscriber who does not register on the current MSC/VLR. The specific steps are as described above.

Figure 9:
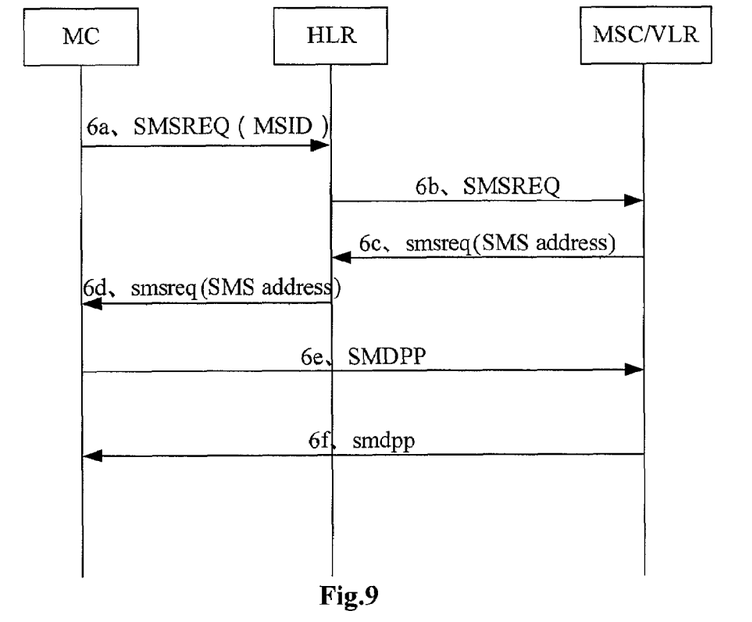
FIG. 9 is a schematic flow chart of Short Message Service Delivery according to one or more embodiments of the invention.

When the terminating service is short message service delivery, the process of the method of the invention is shown in FIG. 9, the specific steps of which will be illustrated in the following texts.

6a. An MC (SMS Center) sends a request, i.e. SMSREQ, which carries a called MSID, to HLR, for requesting the location information for SMS delivery of the called party, i.e., SMS Address;

6b. If the HLR detects that failure occurs on the original MSC/VLR in which the subscriber locates, it selects another available MSC/VLR, sends the request, i.e. SMSREQ, for requesting for SMS Address.

6c. The MSC/VLR returns the SMS Address of the subscriber to the HLR via a message, i.e. smsreq;

6d. The HLR returns the SMS Address of the subscriber to the MC via a message, i.e. smsreq;

6e. The MC delivers a short message to the MSC/VLR with the SMS Address;

6f. The MSC/VLR returns a message, i.e. smdpp.

There are a plurality of methods for sending a short message from an MSC to an MS, which will be illustrated briefly in the following texts.

Figure 10:
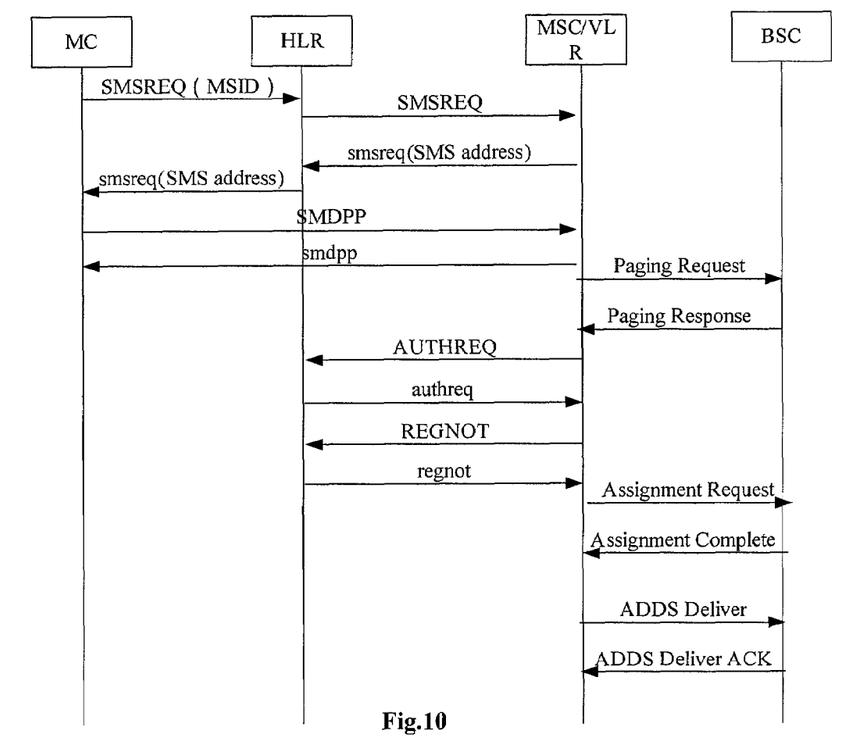
FIG. 10 is a schematic flow chart showing the process in which a short message is delivered in a service channel according to one or more embodiments of the invention.

Optionally as shown in FIG. 10, the steps to deliver a short message in a service channel are similar to those of a terminating call process, and it will not be described again here. Depending on whether paging area information is saved in the HLR or not, the MSC pages a subscriber according to the paging area obtained from the HLR or in whole network paging mode. After the assignment is completed, the MSC sends a message, i.e. ADDS Deliver, to BSC and then to the MS.

Figure 11:
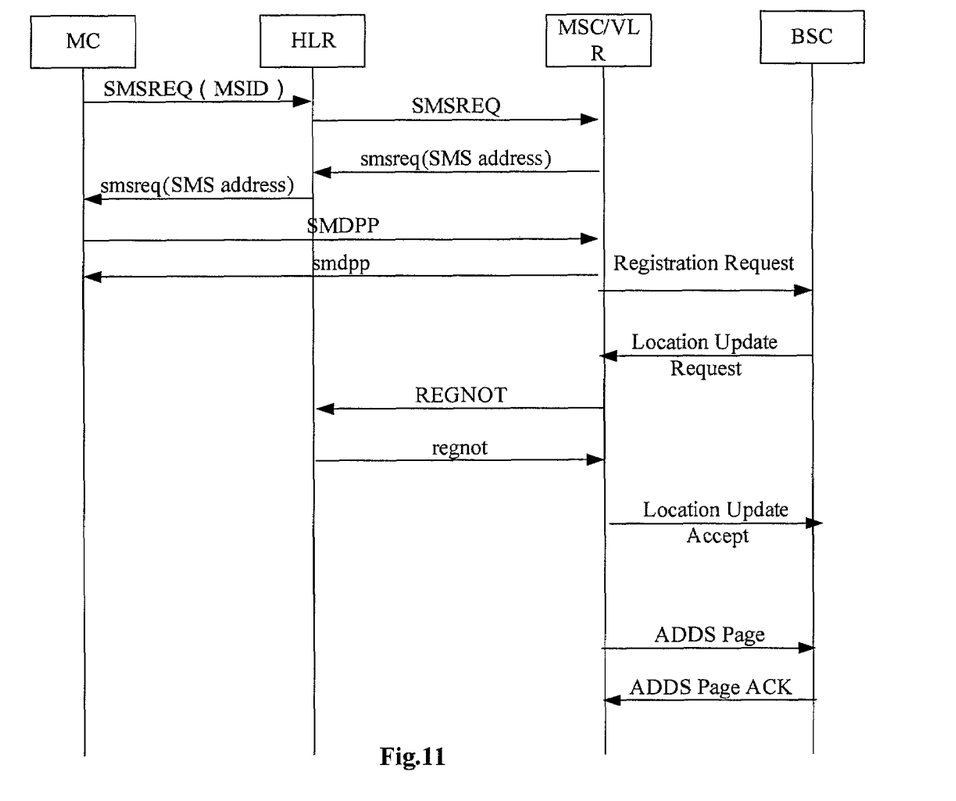
FIG. 11 is a schematic flow chart showing the process in which a short message is delivered in a control channel according to one or more embodiments of the invention.

Optionally as shown in FIG. 11, a short message is delivered in a control channel, and depending on whether paging area information is saved in the HLR or not, an MSC delivers a message, i.e. Registration Request, to the paging area obtained from the HLR or to all the BSCs connected. After a subscriber performs location registration, the short message is delivered to the subscriber via the control channel using a message, i.e. ADDS Page.

Similarly, when the HLR sends a request, i.e. SMSREQ, to the MSC/VLR selected for requesting SMS Address, it may also carry a flag which indicates that the subsequent service needs to be performed. This flag enables the reselected MSC/VLR to determine whether or not a terminating service needs to be performed on the subscriber who has not registered in the current MSC/VLR. The specific steps are as described above.

One or more embodiments of the invention further provides a system for coping with MSC failure, which includes at least one BSC, at least two MSCs and at least one HLR; wherein the BSC is used for connecting subscriber apparatuses for communication, and is connected to the at least two MSCs/VLRs for communication, and a subscriber may access the system via the BSC; the MSC is connected with an HLR. In the system, the HLR includes: a detecting module, for detecting the state of an MSC connected; and a selecting module, used for selecting a second MSC for a subscriber which registered on the first MSC to proceed the terminating process after failure occurs on the first MSC. It should be noted that the MSC may be with a VLR function, that is, the MSC in the system of the embodiments may be an MSC/VLR.

If one BSC is connected with only one MSC, when failure occurs on the first MSC, the problem cannot be solved even if the HLR selects a second MSC, for the newly selected MSC is not connected with the BSC in which the subscriber locates. Therefore, in the system provided by the embodiments of the invention, the BSC may be connected with two MSCs, or it may also be connected with a plurality of MSCs. However, it should be ensured that the BSC has at least two MSCs that administrated by the HLR.

By using the system, the detecting module of the HLR may detect the state of MSCs connected, when failure occurs on MSC1/VLR1 on which a called party registered when the called party receives the terminating service, the selecting module of the HLR selects another MSC2/VLR2 for the subscriber according to a strategy to perform terminating service, so that it is ensured that the terminating service may be proceeded. The specific method is as described above, and the modules of the HLR will be illustrated in the following texts.

One or more embodiments of the invention further provide an apparatus for coping with MSC failure, which may be an HLR. In the HLR a detecting module for detecting the state of MSCs connected and a selecting module for selecting an MSC from all the MSCs connected are added. In the processing of a service, if the service-processing module finds that the state of the serving MSC saved in the database is failed when it processes the corresponding message of a terminating service, then the MSC selecting module is triggered to determine a new available MSC for proceeding the subsequent service, according to local configuration or mutual-aid node information of the serving MSC saved in the database.

Figure 12:
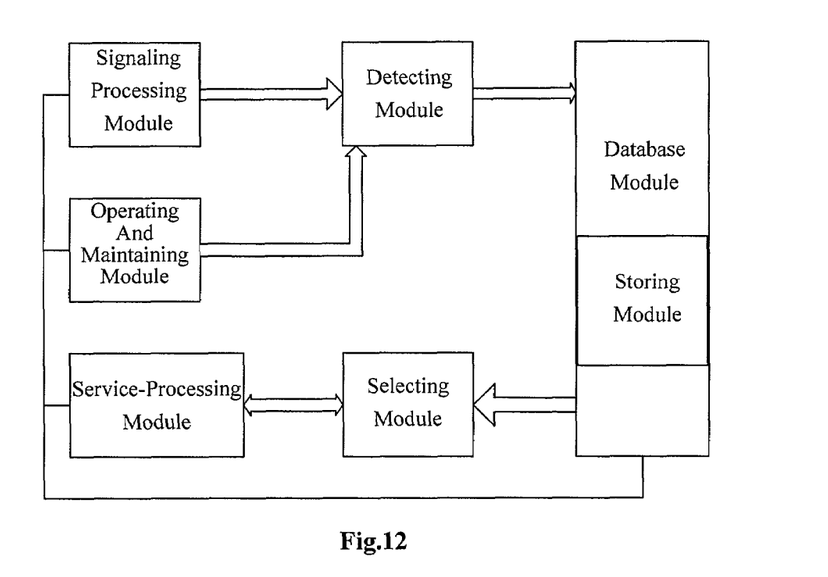
FIG. 12 is a schematic diagram showing interior functional modules of HLR according to one or more embodiments of the invention.

The HLR may include a signaling processing module, a service-processing module, an operating and maintaining module and a database module. It further includes: a detecting module, for detecting the state of MSCs connected; and a selecting module, for selecting an MSC. The schematic diagram of the HLR interior functional modules is shown in FIG. 12; wherein, the detecting module is connected with the signaling processing module, the operating and maintaining module and the database module; the selecting module is connected with the service-processing module and the database module; wherein, each of the modules is connected respectively as shown in FIG. 12, for interacting internally and cooperating with each other to accomplish the functions of the whole HLR. Such HLR apparatus is applicable for the system provided by the embodiments of the invention.

The detecting module has an interface for external use. When it is determined that a certain MSC is unreachable by the signaling processing module or by receiving information input from the operating and maintaining module or by failure information from other exterior entities is received, this event will be recorded in the database; that is, failure information will be saved in the database. However, failure information may also be saved in other modules, and in the embodiments of the invention, the specific location in an HLR where failure information is saved is not limited. The connection relationship between the modules may vary depending on the location where failure information is saved. In FIG. 12, failure information being saved in a database module is taken as an example. It can be understood that the operating and maintaining module is used for notifying the detecting module of the operation and maintenance information under the control of the signaling processing module. The database may also be used for recording the corresponding data needed in communication.

When a terminating service comes, the signaling processing module receives the message and notifies the service-processing module. If the service-processing module detects that failure occurs on the MSC from which Location Information of the called party needs to be obtained, the service-processing module triggers the selecting module to reselect a new MSC with a certain strategy, and an interaction process is performed on the new MSC under the control of the service-processing module with the cooperation of the signaling processing module.

The HLR may also includes a storing module, for storing subscriber-paging area information, i.e., the location information of a paging area in which the subscriber locates; as shown in FIG. 12, the storing module may be set in the database module or independently; when the storing module is set independently, it is connected with the service-processing module at least, and it may also be connected with the signaling processing module. The paging area location information is used to determine the location or area for paging a subscriber, and the location information may be LAC (Location Area Code) or BSC ID. The BSC ID can identify a BSC uniquely in the area of an access network; for example, the BSC ID can identify a BSC uniquely in the area defined in the A-Flex architecture. By using a storing module, subscriber-paging area information can be stored in an HLR. When failure occurs on MSC1/VLR1, the detecting module of the HLR detects that failure occurs on the MSC, and when a subscriber registered on MSC1/VLR1 receives a terminating service, the selecting module of the HLR selects another MSC, i.e. MSC2/VLR2, for the subscriber to proceed the terminating service according to a certain strategy; when the HLR is to send a request to MSC2/VLR2, if it detects that the subscriber-paging area information is saved in the storing module, then the paging area location information of a subscriber saved in the storing module will be carried in the request under the control of the service-processing module or the signaling processing module; when MSC2/VLR2 subsequently needs to page the subscriber or to search for the subscriber using Registration Request, the paging area location information obtained can be used to reduce the searching area. During a location registration process, if change occurs in the information of a paging area in which the subscriber locates, the MSC/VLR will send a request REGNOT (Registration Notice), which carries the paging area information, to the HLR, and the HLR updates and saves the paging area location information in the storing module under the control of the service-processing module or the signaling processing module. The request REGNOT is mainly used for reporting the new location information of a subscriber to the HLR. The specific method is as described above.

Therefore, by using the system, apparatus and method of the embodiments, when it is required to implement a disaster recovery mechanism, especially when failure occurs on an MSC/VLR, by HLR selecting another available MSC in the A-Flex area, a subscriber registered on the failed MSC/VLR is enabled to receive terminating service in the right way, thus the disaster recovery scheme of a circuit domain in CDMA2000 network becomes more complete, and the system stability can be improved.

In the above text, the A-Flex mechanism is taken as an example for illustration. The principle is also suitable for Iu-Flex mechanism, and the process is the same, so it will not be described again here.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

The invention claimed is:

1. A method for coping with mobile switching node failure, comprising:
   detecting that failure occurs on a first Mobile Switching Center by a Home Location Register;
   submitting, in response to the failure being detected, a request to the Home Location Register for obtaining location information of a called party by a requesting party of a terminating service, wherein the called party is registered on a first Mobile Switching Center, and selecting a second Mobile Switching Center for the requesting party and requesting for the location information from the second Mobile Switching Center by the Home Location Register;
   returning the location information to the Home Location Register by the second Mobile Switching Center;
   returning the location information to the requesting party of the terminating service by the Home Location Register, and performing subsequent service according to the location information by the requesting party of the terminating service;
   obtaining paging area information, and sending the paging area information to the second Mobile Switching Center by the Home Location Register; and
   paging the called party in an area according to the paging area information of the called party, by the second Mobile Switching Center, before the second Mobile Switching Center returns the location information to the Home Location Register.

2. The method according to claim 1, wherein the paging area information is sent to the second Mobile Switching Center by the Home Location Register via a Mobile Application Part message.

3. The method according to claim 2, wherein the process in which the Home Location Register obtains the paging area information comprises:
   sending a location update message carrying subscriber-paging area information to the Home Location Register by the Mobile Switching Center, according to a change in information of the paging area in which the called party locates.

4. The method according to claim 3, wherein the subscriber-paging area information reported to the Home Location Register by the Mobile Switching Center is carried in a Mobile Application Part location update request message.

5. The method according to claim 1, wherein the paging area information is sent to the requesting party by the Home Location Register via a Mobile Application Part message, and the requesting party carries the paging area information to the second Mobile Switching Center in an incoming message.

6. A system for coping with mobile switching node failure, comprising:
   a Home Location Register;
   at least two Mobile Switching Centers operatively connected to the Home Location Register;
   wherein the Home Location Register is configured to detect that failure occurs on a first Mobile Switching Center of the at least two Mobile Switching Centers, receive a request from a requesting party of a terminating service for obtaining location information for a called party, select a second Mobile Switching Center for the requesting party and request the location information from the second Mobile Switching Center, receive the location information returned by the second Mobile Switching Center, and send the location information to the requesting party of the terminating service, obtain and save paging area information, and subsequently send the paging area information to the second Mobile Switching Center, and
   wherein the second Mobile Switching Center is configured to page the called party in an area according to the paging area information and return the location information to the Home Location Register prior to the page.

7. A method for coping with mobile switching node failure, comprising:
   detecting that failure occurs on a first Mobile Switching Center by a Home Location Register;
   submitting a request to the Home Location Register for obtaining location information of a called party by a requesting party of a terminating service, wherein the called party is registered on a first Mobile Switching Center, and selecting a second Mobile Switching Center for the requesting party, and requesting for the location information from the second Mobile Switching Center by the Home Location Register;
   returning the location information to the Home Location Register by the second Mobile Switching Center;
   returning the location information to the requesting party of the terminating service by the Home Location Register, and performing subsequent service according to the location information by the requesting party of the terminating service;
   obtaining paging area information, and sending the paging area information to the second Mobile Switching Center by the Home Location Register; and
   paging the called party in an area according to the paging area information of the called party, by the second Mobile Switching Center, before returning the location information to the Home Location Register.

8. The method according to claim 7, wherein the Home Location Register selects the second Mobile Switching Center according to local configuration information or according to mutual-aid Mobile Switching Center information obtained from the first Mobile Switching Center.

9. The method according to claim 7, wherein when the Home Location Register is to request the location information from the second Mobile Switching Center, a flag indicating that the second Mobile Switching Center needs to process the subsequent terminating services is carried in the request.

10. The method according to claim 7, wherein the paging area information is sent to the second Mobile Switching Center by the Home Location Register via a Mobile Application Part message.

11. The method according to claim 7, wherein the paging area information is sent to the requesting party by the Home Location Register via a Mobile Application Part message, and the requesting party carries the paging area information to the second Mobile Switching Center in an incoming message.

12. The method according to claim 7, wherein the process in which the Home Location Register obtains the paging area information comprises:
   sending a location update message carrying subscriber-paging area information to the Home Location Register by the Mobile Switching Center, according to a change in information of the paging area in which the called party locates.

* * * * *

UNITED STATES PATENT AND TRADEMARK OFFICE
CERTIFICATE OF CORRECTION

| | | |
|---|---|---|
| PATENT NO. | : 7,840,213 B2 | Page 1 of 1 |
| APPLICATION NO. | : 11/756123 | |
| DATED | : November 23, 2010 | |
| INVENTOR(S) | : Wenyu Liu and Fang You | |

It is certified that error appears in the above-identified patent and that said Letters Patent is hereby corrected as shown below:

Title Page; Section (30) under Foreign Application Priority Date, the serial number should read "2006 1 0060974.4"

Signed and Sealed this
Twenty-fifth Day of January, 2011

David J. Kappos
*Director of the United States Patent and Trademark Office*